Jan. 12, 1954  W. KRÄMER  2,666,178
FREQUENCY MULTIPLIER

Filed Oct. 7, 1950  3 Sheets-Sheet 1

Inventor:
Werner Krämer

Jan. 12, 1954  W. KRÄMER  2,666,178
FREQUENCY MULTIPLIER
Filed Oct. 7, 1950  3 Sheets-Sheet 2

Inventor:
Werner Krämer

Jan. 12, 1954

W. KRÄMER 2,666,178

FREQUENCY MULTIPLIER

Filed Oct. 7, 1950

Inventor:
Werner Krämer

Patented Jan. 12, 1954

2,666,178

UNITED STATES PATENT OFFICE 2,666,178

FREQUENCY MULTIPLIER

Werner Krämer, Frondenberg-Ruhr, Germany, assignor to Licentia Patent-Verwaltungs-G. m. b. H., Hamburg, Germany, a corporation of Germany Application October 7, 1950, Serial No. 188,966

6 Claims. (Cl. 321—7)

The present invention relates to an arrangement for frequency multiplication, and particularly for transforming a three-phase current having a predetermined frequency into a single-phase current having twice the predetermined frequency.

In arrangements of the kind described transformers are used the cores of which carry auxiliary windings supplied with a direct current for establishing a pre-magnetization of the cores.

It is an object of the present invention to avoid the insertion of special inductances or filter circuits in the circuit of the auxiliary windings.

It is another object of the present invention to provide an arrangement of the kind described which distributes the load uniformly among the feeding three-phase mains.

An arrangement according to this invention comprises in its broadest aspect three-phase mains carrying a current having the predetermined frequency, a plurality of cores each consisting of magnetic material, means for establishing in each of the cores a constant pre-magnetization, a plurality of primary windings arranged, respectively, on the cores and connected to the three-phase mains, a plurality of secondary windings arranged, respectively, on the cores and adapted to carry a single-phase current having twice the predetermined frequency, and means for connecting the primary windings to the three-phase mains so as to neutralize in the pre-magnetizing means the voltage induced therein having twice the predetermined frequency.

Preferably series connected auxiliary windings supplied with direct current are arranged on the cores for establishing in each of said cores a constant pre-magnetization.

In one embodiment of the present invention two sets each including two cores are provided and the primary windings associated, respectively, with the sets are connected in Scott connection to the three-phase mains. Preferably the secondary windings are connected to one another so as to supply a single-phase current having twice the predetermined frequency.

An embodiment of the present invention comprises in combination three-phase mains carrying a current having the predetermined frequency, a first core, a second core, a third core, a fourth core, the cores each consisting of a magnetic material, series-connected auxiliary windings supplied with direct current and arranged on the cores, respectively, for establishing in each of the cores a constant pre-magnetization, a first primary winding arranged on the first core and connected with one end thereof to a first phase of the three-phase mains, a second primary winding arranged on a second core and connected with one end thereof in series and in opposition to the first primary winding, a third primary winding and a fourth primary winding arranged on the third core, a fifth primary winding and a sixth primary winding arranged on the fourth core, the third primary winding being connected in series and opposition to the sixth primary winding connected to a second phase of the three-phase mains, the fifth primary winding being connected in series and opposition to the fourth primary winding connected to the third phase of the three-phase mains, the third primary winding and the fifth primary winding having a junction connected to the other end of the second primary winding, four secondary windings arranged, respectively, on the cores, and connections between the secondary windings so as to connect the secondary windings to supply a single-phase current having twice the predetermined frequency. The secondary windings may be connected in series to each other or in parallel-connected pairs of series-connected windings. A capacitive load may be connected to the secondary windings.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 5:
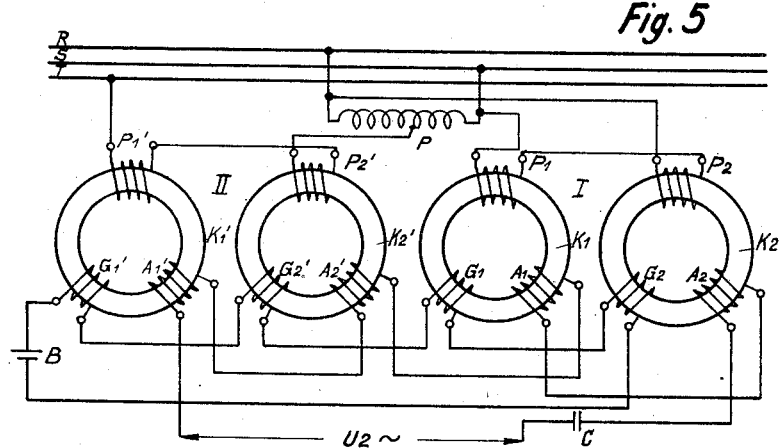
Fig. 5 is a circuit diagram of a first embodiment according to the invention.
Figure 6:
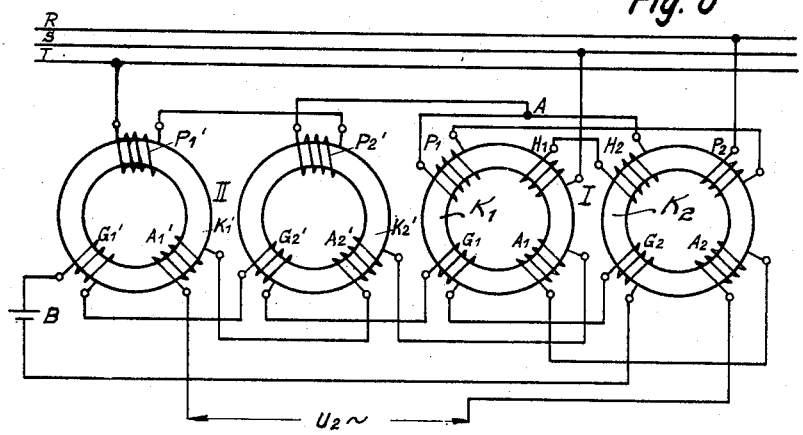
Fig. 6 is a similar circuit diagram of a second embodiment.
Figure 9:
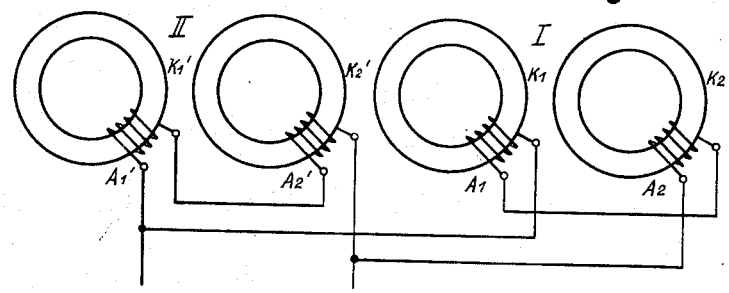
Figure 10:
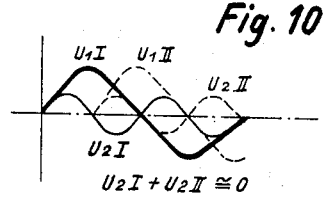
Figure 11:
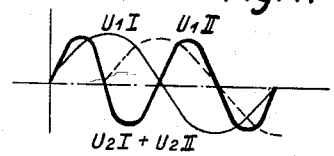

Fig. 9 is a part diagram corresponding to Figs. 5 and 6 showing a different connection of the secondary windings; and Figs. 10 and 11 are voltage diagrams for explaining the operation of the arrangements shown in Figs. 5 and 6.

Figure 1:
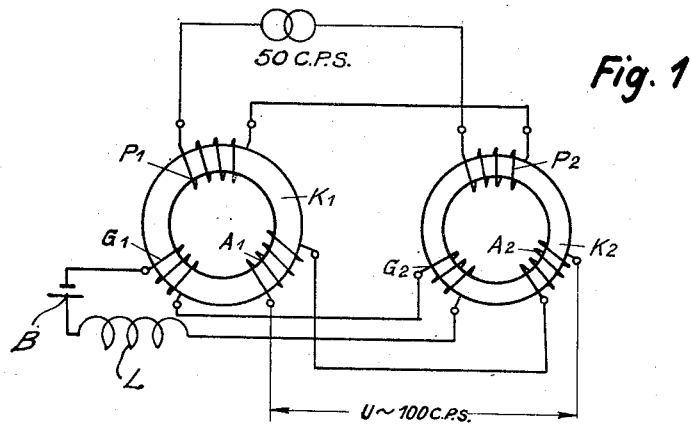
Fig. 1 is a wiring diagram of a frequency doubling transformer which explains some of the principles of the present invention.

Referring now to the drawings and first to Fig. 1, the arrangement comprises two cores $K_1$ and $K_2$ consisting of a magnetic material such as laminated iron. The cores are shown as toroids but it should be understood that any other shape such as a rectangular core is suitable for the invention. The cores carry primary windings $P_1$ and $P_2$, respectively, which are connected in series and opposition to each other, the ends of the series connections being connected to a single-phase alternating mains supplying a voltage $U$ with a frequency of for instance, 50 cycles per second to the series connection of the primary windings. Furthermore, the cores $K_1$ and $K_2$ carry auxiliary or biasing windings $G_1$ and $G_2$, respectively, which are connected in series in a circuit containing a battery $B$ and an inductivity $L$. Also two secondary windings $A_1$ and $A_2$ are, respectively, arranged on the cores $K_1$ and $K_2$ which are connected in series and supplied a voltage which has twice the frequency of the voltage supply to the primary windings $P_1$ and $P_2$, for instance a frequency of 100 cycles per second.

The cores $K_1$ and $K_2$ consist of a magnetic material the magnetization characteristic of which reaches its maximum at a small field intensity and does not further increase at higher field intensities. Therefore the cores $K_1$ and $K_2$ are pre-magnetized by the direct current from the battery $B$ and carry the maximal flux under the influence of the auxiliary windings $G_1$ and $G_2$.

The operation of this arrangement is as follows:

The alternating voltage supplied to the primary windings $P_1$ and $P_2$ causes an alternating flux which is superimposed to the constant flux generated by the auxiliary windings $G_1$ and $G_2$. The alternating flux during one half cycle is in the same direction as the constant pre-magnetization in one of the cores, while in opposite direction to the constant pre-magnetization in the other core. Hence there will be no increase of the flux in the core in which the alternating flux is in the same direction as the constant pre-magnetization, while an increase in flux will take place in the other core. During the next half cycle of the alternating voltage the saturated and non-saturated condition for each core will be reversed. As a result of the changing flux in the respective cores, a voltage is induced into the secondary windings $A_1$ and $A_2$, which windings are connected in series to yield an output voltage having twice the frequency of the primary voltage. At the same time an output voltage having twice the frequency of the primary voltage, the second harmonic, is developed across the biasing windings $G_1$, $G_2$ thereby necessitating the use of an inductance $L$, or a suitable filter circuit, in the direct current circuit to prevent the short circuiting of said direct current circuit. The operation of the arrangement illustrated in Fig. 1 is explained in greater detail in the explanation of the operation of Figs. 2 and 3.

Figure 2:
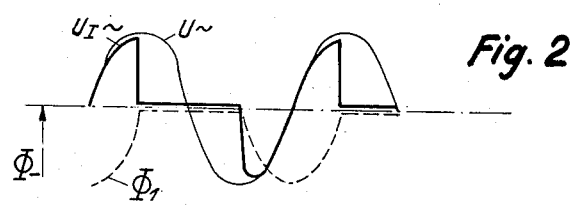
Figs. 2, 3 and 4 are voltage diagrams for illustrating the operation of the arrangement shown in Fig. 1.
Figure 3:
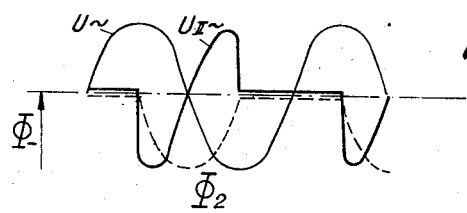

Figures 2 and 3 show diagrams of the conditions prevailing in the cores $K_1$ and $K_2$, respectively. Be it assumed that in the first half cycle the alternating flux is in the same direction as the constant pre-magnetization in core $K_1$ and opposed to it in core $K_2$. Since in core $K_1$ owing to the saturation caused by the direct current an increase of the flux cannot take place the alternating flux $\Phi_I$ in core $K_1$ is at first equal to zero. Thus the partial voltage $U_I$ in the primary winding $P_1$ is during this time zero so that the full voltage is applied to the primary winding $P_2$ of the core $K_2$. In the second half cycle the alternating magnetization has the same direction as the pre-magnetization due to the direct current, in core $K_2$, whereas the alternating and the D. C. magnetization are opposed to each other in core $K_1$. Thus in the second half cycle the alternating flux $\Phi_{II}$ and thus the partial voltage $U_{II}$ in the primary $P_2$ of the core $K_2$ are zero, and the full voltage is applied to the primary winding $P_1$ of the core $K_1$.

Figure 4:
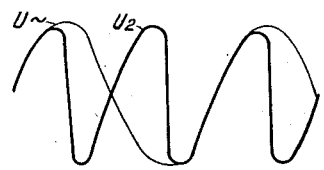

The partial voltages $U_I$ and $U_{II}$ arise also in the secondary windings $A_1$ and $A_2$ and are added to each other by the series connection of the secondary windings so that a secondary voltage $U_2$ is obtained having twice the frequency of the primary voltage, for instance 100 cycles per second as shown in Fig. 4.

The alternating voltage $U_2$ can be taken, if desired, from the direct current auxiliary windings $G_1$, $G_2$. In any case, it is necessary to prevent its being short-circuited in the direct current circuit. The short circuit of the direct current circuit for the alternating secondary voltage is prevented by providing an inductance $L$ or a suitable filter circuit in the direct current circuit. These devices require a relatively large amount of material since they have to be pre-magnetized by the direct current. Also the arrangement shown in Fig. 1 involves the disadvantage that the current supplying mains are only loaded in a single phase whereas mostly a uniform loading of the three phases of a three-phase mains is more advantageous.

Referring now to Fig. 5 of the drawings, $R$, $S$ and $T$ are the three phases of a three-phase mains. Two sets I and II each including two cores $K_1$, $K_2$ and $K_1'$, $K_2'$, respectively, are provided, each core carrying a primary winding, an auxiliary winding and secondary winding as in the arrangement shown in Fig. 1. The primary windings of the cores $K_1$, $K_2$, $K_1'$, $K_2'$, are denoted, respectively, by $P_1$, $P_2$, $P_1'$, $P_2'$, the auxiliary windings by $G_1$, $G_2$, $G_1'$, and $G_2'$, respectively, and the secondary windings by $A_1$, $A_2$, $A_1'$, $A_2'$, respectively. The auxiliary windings $G_1'$, $G_2'$, $G_1$ and $G_2$ are wound in the same sense and connected in series, a battery $B$ being inserted in the circuit containing the auxiliary windings. The auxiliary windings serve to pre-magnetize the cores about which they are wound respectively. The secondary windings are also connected in series in order to yield a single phase output, the secondary windings $A_1$ and $A_2$ of the set I being oppositely wound to the secondary windings $A_1'$, $A_2'$ of the set II, so that the secondary windings $A_1$, $A_2$ are wound in opposition to the auxiliary windings $G_1$, $G_2$, respectively. Since the secondary windings $A_1$ and $A_2$ arranged on cores $K_1$ and $K_2$, respectively, are wound in opposition to the biasing windings $G_1$, $G_2$, and the secondary windings $A_1$, $A_2$ arranged on cores $K_1'$, $K_2'$, respectively, are wound in the same sense as the auxiliary windings $G_1'$, $G_2'$, the voltages induced in the secondary winding when added yield a voltage curve having twice the input frequency. A condenser $C$ may be connected in series to the secondary windings which is useful in some applications as more fully described hereinafter.

The primary windings $P_1$, $P_2$, are connected in series and in opposition between the phases $S$ and $R$ of the three-phase mains. The phases $R$ and $S$ are connected to an inductive voltage divider $P$ and the primary windings $P_1'$ and $P_2'$ are connected in series and in opposition to each other between an intermediate point of the voltage divider P and the third phase T of the three-phase mains. The primary windings P₁' and P₂' have $$\frac{\sqrt{3}}{2}$$

as many turns each as each of the primary windings P₁ and P₂. Thus it is achieved that the alternating voltage supplied to the terminals of the primary windings P₁, P₂ of the set I includes a phase angle of 90° to the alternating voltage supplied to the primary windings P₁', P₂' of the set II. With the above connections of the various windings on the several cores the second harmonic does not appear across the auxiliary windings since the second harmonic generated in one pair of the secondary windings will be 180° out of phase with the second harmonic generated in the other pair of auxiliary windings, said auxiliary windings being connected in such manner as to effect a cancellation of the second harmonic voltage.

Figure 7:
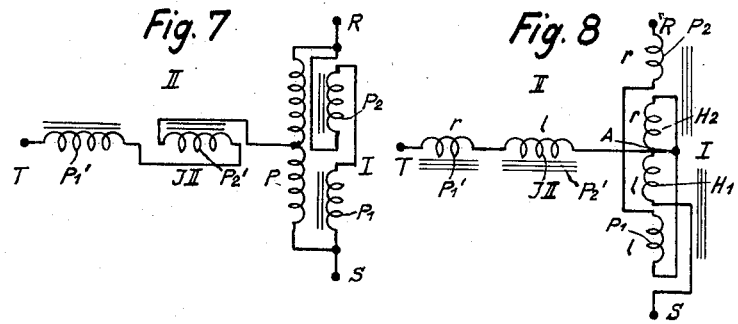
Figs. 7 and 8 are schematic wiring diagrams showing the interconnections of the primary windings shown in Figs. 5 and 6, respectively.

Figure 7 shows the connection of the primary windings of Figure 5 in a simplified diagram from which it is seen that the primary windings P₁ and P₂ are connected in series and opposition and so are the primary windings P₁' and P₂'. The current $J_{II}$ in the primary windings P₁' and P₂' are subdivided at the tapping point of the inductive voltage divider P into two equal parts which compensate each other within each of the primary windings P₁ and P₂ of the set I.

Figure 8:
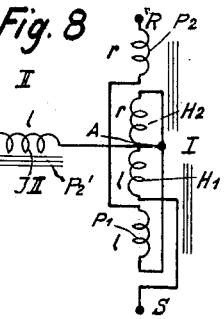

Referring now to Fig. 6 of the drawings, showing a similar arrangement to that shown in Figure 5, it will be seen that the primary windings associated with the set I are used as a voltage divider. To this end each of the cores K₁, K₁ is provided with two primary windings P₁, H₁ and P₂, H₂, respectively, which are connected as separately shown in Fig. 8 in which the sense in which the primary windings are wound is denoted by the letters $r$ and $l$, standing for right and left. It will be seen that the phase R is connected to the primary winding P₂ wound in a right sense and connected to the primary winding P₁ wound in a left sense and connected to the primary winding H₂ wound in the right sense and connected to the primary winding H₁ wound in the left sense and connected to the phase S. The primary winding P₂' is connected to the junction of the primary windings P₁ and H₂. In consequence thereof, the current $J_{II}$ flowing through the primary windings P₁' and P₂' is subdivided into equal parts which compensate each other in the primary windings P₁, H₁ and P₂, H₂, respectively, said primary windings having an equal number of turns. With the connection of the primary windings as set forth above the second harmonics will not appear across the auxiliary windings for the reasons already stated in the explanation of the arrangement illustrated in Fig. 5.

Referring now to Fig. 9 showing only the cores K₁, K₂, K₁', K₂' and the secondary windings A₁, A₂, A₁', A₂', it is seen that the secondary windings may be connected in series by two and the series connections connected in parallel to the output terminal of the device.

The operation of these devices is as follows:

Referring to Fig. 10 of the drawings, showing a diagram for the explanation of the operation of the devices shown in Figs. 5 and 6, $U_{1,I}$ is the voltage curve of the alternating voltage applied to the primary windings P₁, P₂ of set I, $U_{1,II}$ is the alternating voltage applied to the primary windings P₁', P₂' of set II which has a phase lag of 90° with respect to $U_{1,II}$. $U_{2,I}$ is the second harmonic of the alternating voltage $U_{1,I}$ whereas $U_{2,II}$ is the second harmonic of the alternating voltage $U_{1,II}$, which lags with respect to the second harmonic $U_{2,I}$ by 2×90° i. e. 180°. In consequence thereof, the second harmonics do not appear in the auxiliary windings so that an additional inductance L or a filtering circuit can be dispensed with in contra-distinction to the device shown in Fig. 1. Since the secondary windings A₁, A₂ in set I are wound in opposition to the auxiliary windings G₁, G₂ and the secondary windings A₁', A₂' in set II are wound in the same sense as the auxiliary windings G₁', G₂' the voltages $U_{2,I}$ and $U_{2,II}$ are added to each other in the secondary windings as shown in Fig. 11 and result in a voltage curve having twice the predetermined frequency. If the secondary windings are loaded the reaction on the primary windings of each set is effected uniformly as in separate single phase connections so that the effective values of all the currents appearing in the mains have equal values.

The frequency transformer according to the invention which has been described so far does not only transform the frequency but transforms three-phase current into single-phase current. For this reason it can be advantageously used as a welding transformer or a transformer supplying an electric furnace. The transformer according to the invention has a high internal reactance so that it can be used directly for alternating arc welding. The short circuit intensity is proportional to the direct current pre-magnetization so that it can be controlled in a simple manner.

The frequency transformer according to the invention which has been described so far can also be used with advantage as a voltage supply for resistance welding plants and melting furnaces in which case an additional capacitive load C (Fig. 5) may be applied to the secondary output of the transformer in order to reduce considerably the rating and to improve the power factor. By means of the direct current pre-magnetization a continuous control of such arrangements can be effected with simple means.

It will be understood that each of the elements described above, or two or more together, may also find a useful application in other types of frequency multipliers differing from the types described above.

While I have illustrated and described the invention as embodied in an arrangement for transforming a three-phase current having a predetermined frequency into a current having twice the predetermined frequency, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What I claim as new and desire to secure by Letters Patent is:

1. An arrangement for transforming a three-phase current having a predetermined frequency into a single-phase current having twice the predetermined frequency, comprising in combination, a three-phase mains carrying a current having the predetermined frequency; a first core; a second core; a third core; a fourth core, said cores each consisting of a magnetic material; biasing windings supplied with direct current and connected in series adding and arranged on said cores, respectively, for establishing in each of said cores a constant pre-magnetization; a first primary winding arranged on said first core and connected with one end thereof to a first phase of said three-phase mains; a second primary winding arranged on said second core and connected with one end thereof in series and in opposition to the other end of said first primary winding; a third primary winding and a fourth primary winding arranged on said third core; a fifth primary winding and a sixth primary winding arranged on said fourth core, said third primary winding being connected at one end in series and opposition to one end of said sixth primary winding, the other end of said sixth primary winding being connected to a second phase of said three-phase mains, said fifth primary winding being connected at one end in series and opposition to one end of said fourth primary winding, the other end of said fourth primary winding being connected to the third phase of said three-phase mains, the other ends of said third primary winding and said fifth primary winding having a junction connected to the other end of said second primary winding; four secondary windings arranged, respectively, on said four cores and connections between said secondary windings connecting the secondary windings arranged on said first and second cores in series adding, and the secondary windings of said third and fourth cores in series adding, said secondary windings arranged on said first and second cores being connected to said secondary windings arranged on said third and fourth cores in series opposing.

2. An arrangement for transforming a three-phase current having a predetermined frequency into a single-phase current having twice the predetermined frequency, comprising in combination, a three-phase mains carrying a current having the predetermined frequency; a first core; a second core; a third core; a fourth core, said cores each consisting of a magnetic material; biasing windings supplied with direct current and connected in series adding and arranged on said cores, respectively, for establishing in each of said cores a constant pre-magnetization; a first primary winding arranged on said first core and connected with one end thereof to a first phase of said three-phase mains; a second primary winding arranged on said second core and connected with one end thereof in series and in opposition to the other end of said first primary winding; a third primary winding and a fourth primary winding arranged on said third core; a fifth primary winding and a sixth primary winding arranged on said fourth core, said third primary winding being connected at one end in series and opposition to one end of said sixth primary winding, the other end of said sixth primary winding being connected to a second phase of said three-phase mains, said fifth primary winding being connected at one end in series and opposition to one end of said fourth primary winding the other end of said fourth primary winding being connected to the third phase of said three-phase mains, the other ends of said third primary winding and said fifth primary winding having a junction connected to the other end of said second primary winding; four secondary windings arranged, respectively, on said four cores; and connections between said secondary windings connecting the secondary windings arranged on said first and second cores in series adding, and the secondary windings of said third and fourth cores in series adding, said secondary windings arranged on said first and second cores respectively being connected to said secondary windings arranged on said third and fourth cores in series opposing so as to connect said series connected secondary windings arranged on said first and second cores in parallel with said series connected secondary windings arranged on said third and fourth cores.

3. An arrangement for transforming a three-phase current having a predetermined frequency into a single phase current having twice the predetermined frequency, comprising in combination, a three-phase mains carrying a current having the predetermined frequency; a first core; a second core; a third core; a fourth core, said cores each consisting of a magnetic material; four biasing windings supplied with direct current and connected in series adding and arranged on said cores, respectively, for establishing in each of said cores a constant pre-magnetization; a first primary winding arranged on said first core and connected with one end thereof to a first phase of said three-phase mains; a second primary winding arranged on said second core and connected with one end thereof in series and in opposition to the other end of said first primary winding; a primary winding arranged on said third core and connected with one end thereof to a third phase of said three-phase mains; a primary winding arranged on said fourth core and connected with one end thereof in series and in opposition to the other end of said primary winding arranged on said third core; means for connecting said primary windings on said third and fourth cores in Scott connection to said first and second primary windings; four secondary windings arranged, respectively, on said four cores and connections between said secondary windings connecting the secondary windings arranged on said first and second cores in series adding, and the secondary windings of said third and fourth cores in series adding, said secondary windings arranged on said first and second cores being connected to said secondary windings arranged on said third and fourth cores in series opposing.

4. An arrangement for transforming a three-phase current having a predetermined frequency into a single phase current having twice the predetermined frequency, comprising in combination, a three-phase mains carrying a current having the predetermined frequency; a first core; a second core; a third core; a fourth core, said cores each consisting of a magnetic material; four biasing windings supplied with direct current and connected in series adding and arranged on said cores, respectively, for establishing in each of said cores a constant pre-magnetization; a first primary winding arranged on said first core and connected with one end thereof to a first phase of said three-phase mains; a second primary winding arranged on said second core and connected with one end thereof in series and in opposition to the other end of said first primary winding; a primary winding arranged on said third core and connected with one end thereof to a third phase of said three-phase mains; a primary winding arranged on said fourth core and connected with one end thereof in series and in opposition to the other end of said primary winding arranged on said third core; means for connecting said primary windings on said third and fourth cores in Scott connection to said first and second primary windings; four secondary windings arranged, respectively, on said four cores and connections between said secondary windings connecting the secondary windings arranged on said first and second cores in series adding, and the secondary windings of said third and fourth cores in series adding, said secondary windings arranged on said first and second cores being connected to said secondary windings arranged on said third and fourth cores in series opposing, whereby said secondary windings supply a single phase current output having twice the predetermined frequency; and a condenser connected in series with the output of said four secondary windings so as to reduce the rating and to improve the power factor of a transforming arrangement.

5. An arrangement for transforming a three-phase current having a predetermined frequency into a single phase current having twice the predetermined frequency, comprising in combination, a three-phase mains carrying a current having the predetermined frequency; a first core; a second core; a third core; a fourth core, said cores each consisting of a magnetic material; four biasing windings supplied with direct current and connected in series adding and arranged on said cores, respectively, for establishing in each of said cores a constant pre-magnetization; a first primary winding arranged on said first core and connected with one end thereof to a first phase of said three-phase mains; a second primary winding arranged on said second core and connected with one end thereof in series and in opposition to the other end of said first primary winding; an inductive voltage divider connected across a second and a third phase of said three-phase mains, said voltage divider having an intermediate point being connected with the other end of said second primary winding; a primary winding arranged on said third core and connected with one end thereof to said second phase of said three-phase mains; a primary winding arranged on said fourth core and being connected at one end thereof in series and in opposition to the other end of said primary winding arranged on said third core and with the other end thereof to said third phase of said three-phase mains; four secondary windings arranged, respectively, on said four cores and connections between said secondary windings connecting the secondary windings arranged on said first and second cores in series adding, and the secondary windings of said third and fourth cores in series adding, said secondary windings arranged on said first and second cores being connected to said secondary windings arranged on said third and fourth cores in series opposing.

6. An arrangement for transforming a three-phase current having a predetermined frequency into a single phase current having twice the predetermined frequency, comprising in combination, a three-phase mains carrying a current having the predetermined frequency; a first core; a second core; a third core; a fourth core, said cores each consisting of a magnetic material; four biasing windings supplied with direct current and connected in series adding and arranged on said cores, respectively, for establishing in each of said cores a constant pre-magnetization; a first primary winding arranged on said first core and connected with one end thereof to a first phase of said three-phase mains; a second primary winding arranged on said second core and connected with one end thereof in series and in opposition to the other end of said first primary winding; an inductive voltage divider connected across a second and a third phase of said three-phase mains, said voltage divider having an intermediate point being connected with the other end of said second primary winding; a primary winding arranged on said third core and connected with one end thereof to said second phase of said three-phase mains; a primary winding arranged on said fourth core and being connected at one end thereof in series and in opposition to the other end of said primary winding arranged on said third core and with the other end thereof to said third phase of said three-phase mains; four secondary windings arranged, respectively, on said four cores and connections between said secondary windings connecting the secondary windings arranged on said first and second cores in series adding, and the secondary windings of said third and fourth cores in series adding, said secondary windings arranged on said first and second cores being connected to said secondary windings arranged on said third and fourth cores in series opposing, whereby said secondary windings supply a single phase current output having twice the predetermined frequency; and a condenser connected in series with the output of said four secondary windings so as to reduce the rating and to improve the power factor of a transforming arrangement.

WERNER KRÄMER.

References Cited in the file of this patent
UNITED STATES PATENTS

| Number | Name | Date |
|---|---|---|
| 1,917,921 | Burton | July 11, 1933 |
| 2,313,938 | Hall et al. | Mar. 16, 1943 |
| 2,395,389 | Huge | Feb. 26, 1946 |
| 2,418,643 | Huge | Apr. 8, 1947 |